US009584476B2

(12) United States Patent
Liang

(10) Patent No.: US 9,584,476 B2
(45) Date of Patent: Feb. 28, 2017

(54) SAFETY PROTECTION METHOD, FIREWALL, TERMINAL DEVICE AND COMPUTER-READABLE STORAGE MEDIUM

(71) Applicant: Tencent Technology (Shenzhen) Company Limited, Shenzhen (CN)

(72) Inventor: Jiahui Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 178 days.

(21) Appl. No.: 14/513,617

(22) Filed: Oct. 14, 2014

(65) Prior Publication Data

US 2015/0033320 A1 Jan. 29, 2015

Related U.S. Application Data

(63) Continuation of application No. PCT/CN2013/073510, filed on Mar. 29, 2013.

(30) Foreign Application Priority Data

Apr. 26, 2012 (CN) .......................... 2012 1 0126865

(51) Int. Cl.
*H04L 29/06* (2006.01)
*G06F 21/50* (2013.01)
(Continued)

(52) U.S. Cl.
CPC ........... *H04L 63/0209* (2013.01); *G06F 21/50* (2013.01); *H04W 12/12* (2013.01); *H04W 88/02* (2013.01)

(58) Field of Classification Search
CPC .. G06F 21/50; G06F 9/45558; G06F 21/6227; G06F 2009/45587; G06F 2009/45583; G06F 9/44521; G06F 21/53; G06F 21/74; G06F 9/445; G06F 21/56; G06F 9/4425; G06F 21/602; G06F 21/54; G06F 21/51; G06F 2221/2149; G06F 2221/2141; H04W 12/12; H04W 88/02; H04L 63/0209; H04L 63/1408; H04L 63/0227

See application file for complete search history.

(56) References Cited

U.S. PATENT DOCUMENTS 8,468,595 B1 * 6/2013 Huang ................ H04L 63/1408
726/1
2010/0287535 A1 11/2010 Kim et al.
(Continued)

FOREIGN PATENT DOCUMENTS

CN 1983296 A 6/2007
CN 101727545 A 6/2010
(Continued)

OTHER PUBLICATIONS

Nauman et al. "Apex: Extending Android Permission Model and Enforcement with User-Defined Runtime Constraints", Proceedings of the 5th ACM Symposium on Information, Computer and Communications Security, ASIACCS '10, Jan. 1, 2010, 12 pages.
(Continued)

*Primary Examiner* — Kambiz Zand
*Assistant Examiner* — Shu Chun Gao
(74) *Attorney, Agent, or Firm* — Marshall, Gerstein & Borun LLP

(57) ABSTRACT

Various examples provide a safety protection method, a firewall, a terminal device and a computer-readable storage medium. According to the method, a firewall injects a code module including a first function capable of modifying package safety information corresponding to an illegal application into a target process, and triggers the first
(Continued)

function to modify the package safety information corresponding to the illegal application to make the illegal application fail to perform an operation due to the modified package safety information.

11 Claims, 3 Drawing Sheets

(51) Int. Cl.
*H04W 12/12* (2009.01)
*H04W 88/02* (2009.01)

(56) References Cited

U.S. PATENT DOCUMENTS

2011/0225624 A1* 9/2011 Sawhney ............... G06F 21/53
 726/1
2013/0091568 A1* 4/2013 Sharif .................... G06F 21/50
 726/22

FOREIGN PATENT DOCUMENTS

| CN | 101984409 A | 3/2011 | |
|---|---|---|---|
| CN | 102355667 A | 2/2012 | |
| KR | WO 2011159005 A1 * | 12/2011 | ............. G06F 9/445 |

OTHER PUBLICATIONS

Jeon et al., "Dr. Android and Mr. Hide: Fine-Grained Security Policies on Unmodified Android", University of Maryland, Department of Computer Science Technical Report CS-TR-5006, Dec. 9, 2011, 14 pages.

Gu He, "Inject Code in Android", URL:http://webcache.googleusercontent.com/search?q=cache:VNIcNnjbaRgJ:vxheaven.org/forum/viewtopic.php%3Fid%3D2105+&ch=18&hl=en&ct=clnk&gl=de, retrieved from the internet on Jul. 8, 20158, 8 pages.

Enck et al., "TaintDroid: An Information-Flow Tracking System for Realtime Privacy Monitoring on Smartphones", The Pennsylvania State University Landon P. Cox Duke University Jaeyeon Jung Intel Labs, Oct. 1, 2010, 16 pages.

Hornyack et al., "These Aren't the Droids You're Looking for: Retrofitting Android to Protect Data from Imperious Applications", Computer and Communications Security, ACM, Oct. 17, 2011, 14 pages.

Office Action in CN Application No. 201210126865.3 dated Jul. 1, 2014, 7 pages.

Extended European Search Report in EP Application No. 13782508.9 dated Jul. 16, 2015, 10 pages.

International Preliminary Report on Patentability and Written Opinion in International Application No. PCT/CN2013/073510 dated Oct. 28, 2014, 5 pages.

Search Report in Application No. PCT/CN2013/073510 dated Jul. 4, 2013.

* cited by examiner

SAFETY PROTECTION METHOD, FIREWALL, TERMINAL DEVICE AND COMPUTER-READABLE STORAGE MEDIUM

The present disclosure is a continuation application of PCT application No. PCT/CN2013/073510 which claims priority of Chinese patent application No. 201210126865.3 titled "Safety Protection method and Firewall" and filed on Apr. 26, 2012 with the Patent Office of the People's Republic of China, the disclosure of which is incorporated by reference.

TECHNICAL FIELD

The present disclosure relates to computer technology, and particularly, to a safety protection method, a firewall, a terminal device and a computer-readable storage medium.

BACKGROUND

At present, mobile phones are providing diversified functions and thus are more and more often used in accessing the Internet. But the more functions a mobile phone provides, the more safety challenges are faced by the mobile phone. Therefore, it has become a common practice to install a firewall in a mobile phone.

In recent Android operating systems for mobile phone, functions of a firewall are implemented by using an iptable/netfilter module in the system kernel. In earlier versions of Android firmware, however, there is no such iptable/netfilter module, and many phone manufacturers add an iptable/netfilter module into mobile phones when compiling ROM (Read-Only Memory) of the mobile phones to enable the mobile phones to provide firewall functions.

SUMMARY

In order to address at least some of the challenges faced by the conventional solution, various examples of the present disclosure provide a safety protection method, a firewall, a terminal device and a computer-readable storage medium. The technical schemes are as follows.

A safety protection method running in a terminal device may include:

a firewall injects a code module including a first function capable of modifying package safety information corresponding to an illegal application into a target process;

the firewall triggers the first function to modify the package safety information corresponding to the illegal application to make the illegal application fail to perform an operation due to the modified package safety information.

A firewall running in a terminal device may include:

an injecting module, adapted to inject a code module including a first function capable of modifying package safety information corresponding to an illegal application into a target process;

a triggering module, adapted to trigger the first function to modify the package safety information corresponding to the illegal application to make the illegal application fail to perform an operation due to the modified package safety information.

A method may include:

a storage device;

at least one program stored in the storage device, adapted to be executed by at least one processor; the at least one program includes instructions for performing the following operations:

injecting a code module including a first function into a target process, wherein the first function is capable of modifying package safety information corresponding to an illegal application;

triggering the first function to modify the package safety information corresponding to the illegal application to make the illegal application fail to perform an operation due to the modified package safety information.

A non-transitory computer-readable storage medium may store at least one program executable by at least one processor to implement a safety protection method which may include:

injecting a code module including a first function into a target process, wherein the first function is capable of modifying package safety information corresponding to an illegal application;

triggering the first function to modify the package safety information corresponding to the illegal application to make the illegal application fail to perform an operation due to the modified package safety information.

Various example of the present disclosure inject a code module capable of modifying package safety information into a target process to modify package safety information corresponding to an illegal application so that the illegal application fails to perform an operation due to the modified package safety information. Therefore, a firewall is realized in a terminal device even when the terminal device does not have an iptable/netfilter module. Further, there is no compatibility problem and the mechanism is not restricted by firmware versions.

BRIEF DESCRIPTION OF THE DRAWINGS

In order to make the technical scheme of embodiments of the present invention more clearly, the following is a brief introduction of the drawings used in description of the embodiments. Obviously, the following drawings are merely some of the embodiments, and based on which other drawings can be obtained by those skilled in the art without doing any inventive work.

DETAILED DESCRIPTION

Some examples are hereinafter described in detail with reference to the accompanying drawings to make the objective, technical scheme and merits of the present invention apparent.

Figure 1:
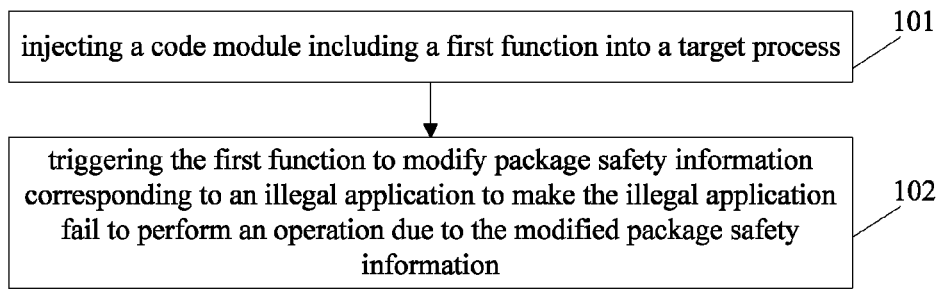
FIG. 1 is a flowchart illustrating a safety protection method in accordance with an example of the present disclosure.

FIG. 1 is a flowchart illustrating a safety protection method. The method may be implemented by software installed in a terminal device. The method may include the following procedures.

At block 101, a code module including a first function is injected into a target process.

The first function is capable of modifying package safety information corresponding to an illegal application.

At block 102, the first function is triggered to modify the package safety information corresponding to the illegal application to make the illegal application fail to perform an operation due to the modified package safety information.

The safety protection method of the examples implements a firewall even in absence of an iptable/netfilter module, does not have compatibility problems and is not restricted by firmware versions.

An example provides a safety protection method which is partly based on the method of the above example.

In an example, the method may be implemented by software, e.g., a firewall application installed in a terminal device. The method can be applied to a Linux-based system.

The following example merely takes a terminal device running an Android system as an example, not for restricting the protection scope. The Android system is a mobile operating system developed based on Linux, but provides a permission-based safety mechanism that has a finer controlling granularity than that of Linux systems. Developers of applications for Android systems (legal applications and illegal applications) need to apply for permissions for the applications in advance in configuration files of the applications. Permissions may include permissions of reading and writing contacts in the system, permissions of accessing the Internet, and the like. When an application is compiled, a compiler may pack permission information, a configuration file, a resource file and a Dex file to form an installation package of the application that is executable in an Android system, e.g., an APK (Android Package) file. The resource file may include strings, colors, arrays, anim, layout, images and icons (drawable), media and other necessary components. The Dex file is a type of file executable in an Android system.

Each time an application is installed in a terminal device running an Android system, the following procedures are performed.

A. Information of an installation package of the application is cached. The information refers to information in the APK package. The operating system may always record information in installation packages into two files, i.e., packages.list and packages.xml, in the directory of /data/system/. The packages.list and the packages.xml store detailed information of each APK that has been installed.

B. A background package manager service (PackageManagerService) may load information from the packages.list and the packages.xml into a memory.

Each application goes through three key procedures to start running in a terminal device running an Android system, i.e., activity manager service (ActiveManagerService)-PackageManagerService-zygote (Zygote). Parameters (i.e., uid, gid and gids) delivered from the PackageManagerService to the Zygote, i.e., the package safety information, determine permissions the application has after the application starts up.

The ActiveManagerService is capable of determining access permissions of applications and managing life cycles of applications.

The PackageManagerService is a java layer service started by a system server (system_server) during a startup process of the system, is capable of managing APK files and deciding functions that can be provided by an application after the application starts up.

The Zygote is a virtual machine process and is also an incubator of virtual machine instances. Each time the system requires an Android application be executed, the Zygote may generate a sub process by using a derive command to execute the application.

The uid refers to a unique identity of an application allocated to an application when the application is installed into a terminal device running an Android system. Uids larger than 10000 are assigned to regular Android applications, and uids smaller than 10000 are assigned to system processes.

The gid of a regular application is identical to the uid of the application. Different applications have different uid and gid, thus uids and gids can protect private data in both the native layer and the java layer.

A gids is generated by the framework during installation of an application, and is related with permissions applied for by an application.

According to an example, a method modifies package safety information in the PackageManagerService so that an error may occur when the illegal application is running and result in termination of the illegal application, thus functions of a firewall are implemented.

The method according to the example is implemented by a firewall installed into a terminal device. The firewall may include four code modules, i.e., an injecting module, a controlling module, a communicating module and a startup module. The injecting module is capable of injecting codes corresponding to the controlling module into a host process, e.g., the system_server, of the PackageManagerService. The startup module is capable of triggering the startup of the controlling module. The communicating module is capable of receiving a parameter set by a user and sending the parameter to the controlling module. The controlling module is capable of modifying a member variable in the PackageManagerService.

Figure 2:
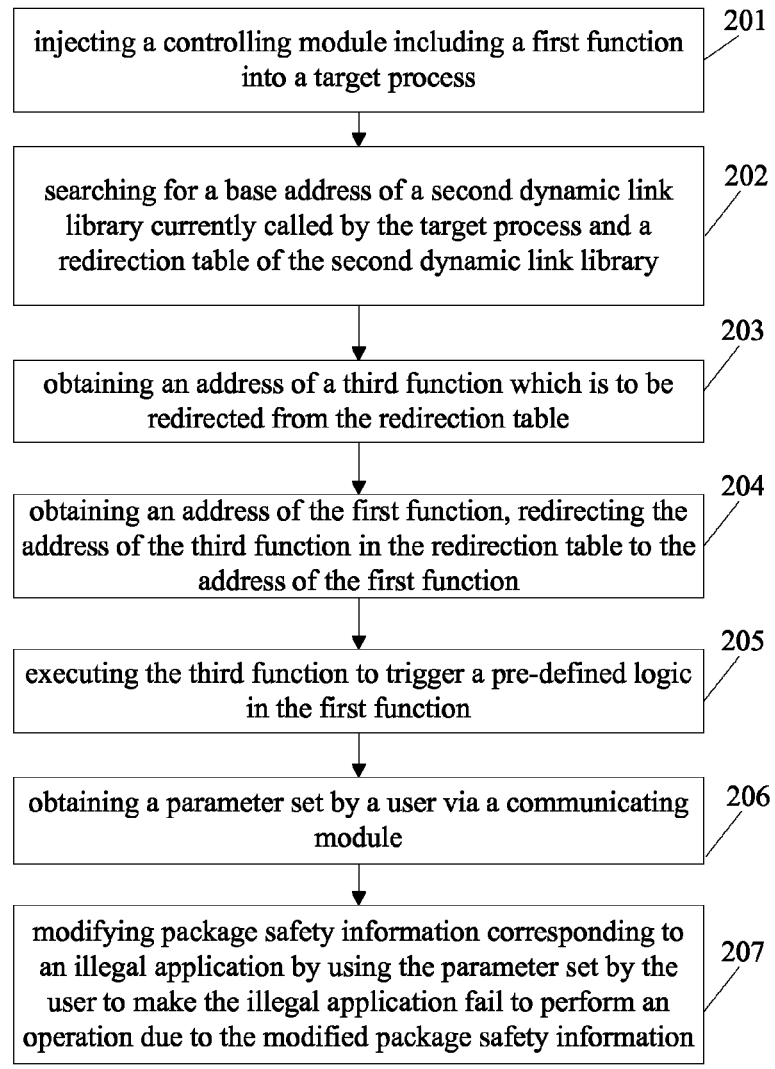
FIG. 2 is a flowchart illustrating a safety protection method in accordance with an example of the present disclosure.

As shown in FIG. 2, a safety protection method may include the following procedures.

At block 201, a code module including a first function is injected into a target process.

The first function is capable of modifying package safety information corresponding to an illegal application. The first function includes a pre-defined logic, i.e., codes for modifying package safety information. The first function is part of the controlling module. The first function overrides a function executed by the target process and adds codes for modifying package safety information into the function. The target process may be the host process of the PackageManagerService, e.g., the system_server.

In an example, when the controlling module including the first function is injected into the target process, a base address of a first dynamic link library is calculated by using an address of the first dynamic link library and an address of a second function which is called by both the target process and a process of the firewall, also referred to as the firewall process, and the address of the first dynamic link library is made point to the address of the controlling module, so that the target process can execute the first function in the controlling module when performing a task.

In an example, a dynamic link library called by both the firewall process and the target process is utilized to guarantee that the controlling module injected into the target process is necessarily executed by the target process. In the following example, the first dynamic link library is libc.so, the second function is dlopen, and the dlopen is a function in libc.so, and the process may include the following procedures.

At block 201-1, a firewall obtains an address of the dlopen function of the firewall process, which is denoted as addr_my_dlopen, and a base address of libc.so, which is denoted as addr_my_base.

The dlopen function is capable of opening a specified first dynamic link library in a specified manner, and includes the address of the dynamic link library to be opened.

At block 201-2, a base address of a libc.so of the target process, which is denoted as addr_other_base, is obtained by checking a directory of /proc/pid/maps.

At block 201-3, a base address of dlopen of the target process, which is denoted as addr_other_dlopen, is calculated.

The addr_other_dlopen=addr_other_base−addr_my_base+addr_my_dlopen.

The base address of the second function can be found in processes by adding an address offset of the second function to the base address of the first dynamic link library. The second function is capable of opening the dynamic link library.

At block 201-4, an address of a register for the target process is modified to be addr_other_dlopen, and the address of the dlopen function of the target process is made point to the address of the controlling module.

The controlling module including the first function is injected into the target process by modifying the address of the register for the target process to be the base address of the second function which serves as an entrance.

The procedure at block 201-4 is implemented by using a ptrace function. The ptrace function is a function provided by linux for modifying an address of a register, a function and the like. A register is capable of storing an address of a currently-running function of the target process.

At block 202, a base address of a second dynamic link library currently called by the target process and a redirection table of the second dynamic link library are searched for.

At block 203, an address of a third function to be redirected is obtained from the redirection table.

The first function is a function overriding the third function so that original functions of the target process are still implemented after the first function is executed. The third function is a function to be called by the target process in the second dynamic link library.

At block 204, the address of the first function is obtained, and the address of the third function in the redirection table is redirected to be the address of the first function.

This procedure makes the first function, instead of the third function, be executed by the target process when the third function is executed by the target process, so that the first function is triggered to modify the package safety information of the application.

At block 205, the third function is executed to trigger a pre-defined logic in the first function.

Since the address of the third function in the redirection table has been modified, the target process is redirected to the address of the first function when executing the third function and thus the logic defined by codes in the first function is triggered.

The procedures at blocks 202-205 may be implemented by the ptrace function.

At block 206, a parameter set by a user is obtained by the communicating module.

In an example, the user may control an application in a mobile phone via an application interface of the firewall. After receiving a controlling command from the user, the application interface may deliver the parameter to the communicating module which forwards the parameter to the controlling module. The parameter is the parameter set by the user, e.g., information of various permissions set by the user for the application.

The process of the communicating module forwards the parameter set by the user may include:

the firewall registers at the operating system to obtain a local service (e.g., referred to as Local Service), and sets a host process, e.g., Firewall_Service, of the Local Service to be in a state of waiting for the application interface to be connected to receive the parameter set by the user, e.g., on/off, app_name and the like.

The communicating module may obtain the parameter which is set by the user and sent by the Firewall_Service via an inter-process communication (IPC) of the Android system, e.g., the binder communication.

At block 207, the first function modifies package safety information corresponding to an illegal application by using the parameter set by the user to make the illegal application fail to perform an operation due to the modified package safety information.

After the package safety information (e.g., gid) of the illegal application is modified, the illegal application cannot run properly because it does not have a valid gid.

In an example, modifications may be done to a legal application to restrict permissions of the legal application.

The safety protection method of the examples implements a firewall even in absence of an iptable/netfilter module, does not have compatibility problems and is not restricted by firmware versions.

Figure 3:
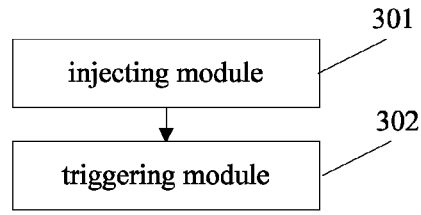
FIG. 3 is a schematic diagram illustrating modules of a firewall in accordance with an example of the present disclosure.

As shown in FIG. 3, a firewall of an example may include the following components.

An injecting module 301 injects a code module including a first function into a target process. The first function is capable of modifying package safety information corresponding to an illegal application.

A triggering module 302 triggers the first function to modify the package safety information corresponding to the illegal application to make the illegal application fail to perform an operation due to the modified package safety information.

In an example, the target process is a host process of a package manager service PackageManagerService, the package safety information is a member variable of PackageManagerService.

Figure 4:
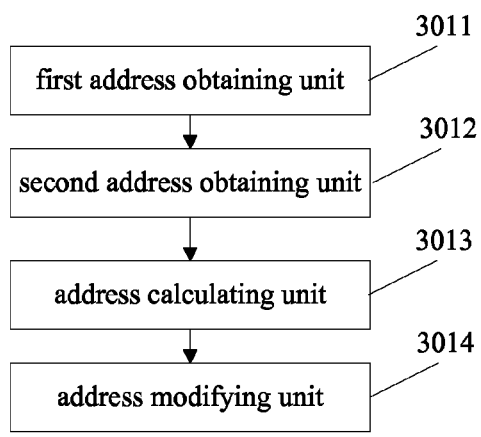
FIG. 4 is a schematic diagram illustrating units of an injecting module in a firewall in accordance with an example of the present disclosure.

In an example as shown in FIG. 4, the injecting module 301 may include the following components.

A first address obtaining unit 3011 obtains an address of a second function of a process of the firewall, which is denoted as A1, and a base address of a first dynamic link library of the process of the firewall, which is denoted as A2.

A second address obtaining unit 3012 obtains a base address of a first dynamic link library of the target process, which is denoted as A3, by looking up a file in a pre-defined directory.

An address calculating unit 3013 obtains an address of a second function of the target process, which is denoted as A4, according to a calculation of A4=A3−A2+A1.

An address modifying unit 3014 modifies an address of a register for the target process to be A4, and makes an address of the dynamic link library called by the second function point to an address of a code module including the first function.

The first dynamic link library is a dynamic link library called by both the process of the firewall and the target process. The second function is in the first dynamic link library. The register records an address of a currently-running function of the target process.

Figure 5:
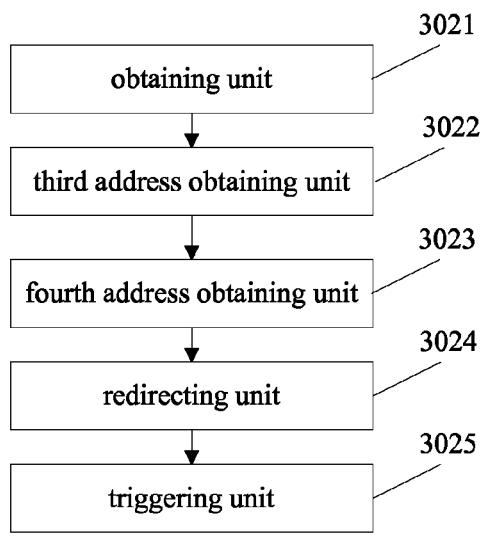
FIG. 5 is a schematic diagram illustrating units of a triggering module in a firewall in accordance with an example of the present disclosure.

In an example as shown in FIG. 5, the injecting module 302 may include the following components.

An obtaining unit 3021 searches for a base address of a second dynamic link library currently called by the target process and a redirection table of the second dynamic link library.

A third address obtaining unit 3022 obtains an address of a third function to be redirected from the redirection table.

A fourth address obtaining unit 3023 obtains an address of the first function, which is denoted as A5.

A redirecting unit 3024 redirects the address of the third function in the redirection table to A5.

A triggering unit 3025 calls the third function to trigger the first function to modify the package safety information corresponding to the illegal application using a parameter set by a user;

The first function is a function overriding the third function. The third function is in the second dynamic link library.

Figure 6:
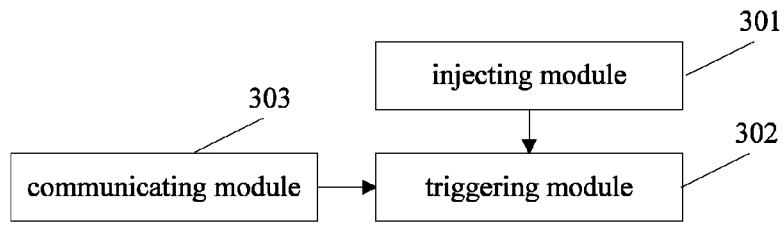
FIG. 6 is a schematic diagram illustrating modules of a firewall in accordance with an example of the present disclosure.

In an example as shown in FIG. 6, the firewall may also include:

a communicating module 303, capable of registering at an operating system to obtain a local service before the triggering module 302 triggers the first function to modify the package safety information corresponding to the illegal application using the parameter set by the user. The local service is capable of waiting for and receiving the parameter set by the user.

The firewall of the examples implements firewall functions even in absence of an iptable/netfilter module, does not have compatibility problems and is not restricted by firmware versions.

Figure 7:
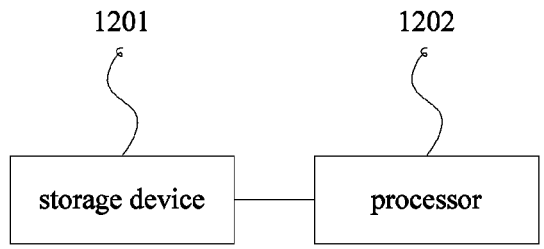
FIG. 7 is a schematic diagram illustrating modules of a terminal device in accordance with an example of the present disclosure; and, FIG. 8 is a schematic diagram illustrating modules of a terminal device in accordance with an example of the present disclosure.

As shown in FIG. 7, a terminal device 1200 may include a storage device 1201 and at least one processor 1202.

The storage device 1201 stores software programs and modules, e.g., program instructions and modules corresponding to the firewall of examples of the present disclosure, and stores data generated during the safety protection process of examples of the present disclosure. The processor 1202 runs the software programs and modules stored in the storage device 1201 to implement various functions and data processing to realize the safety protection mechanism of examples of the present disclosure.

The processor 1202 is configured to implement the following operations.

A firewall injects a code module including a first function into a target process. The first function is capable of modifying package safety information corresponding to an illegal application.

The first function triggers the first function to modify the package safety information corresponding to the illegal application to make the illegal application fail to perform an operation due to the modified package safety information.

In an example, the target process is a host process of a package manager service PackageManagerService, the package safety information is a member variable of the PackageManagerService.

In an example, the procedure of the firewall injecting the code module including the first function into the target process may include:

the firewall obtains an address of a second function of a process of the firewall, which is denoted as A1, and a base address of a first dynamic link library of the process of the firewall, which is denoted as A2;

the firewall obtains a base address of a first dynamic link library of the target process, which is denoted as A3, by looking up a file in a pre-defined directory;

the firewall obtains an address of a second function of the target process, which is denoted as A4, through a calculation of A4=A3−A2+A1;

the firewall modifies an address of a register of the target process to be A4, and make an address of the dynamic link library called by the second function point to an address of the code module including the first function.

The first dynamic link library is a dynamic link library called by both the process of the firewall and the target process. The second function is in the first dynamic link library. The register records an address of a currently-running function of the target process.

In an example, the procedure of the firewall triggering the first function to modify the package safety information corresponding to the illegal application may include:

searching for a base address of a second dynamic link library currently called by the target process and a redirection table of the second dynamic link library; obtaining an address of a third function which is to be redirected from the redirection table;

obtaining an address of the first function, which is denoted as A5;

redirecting the address of the third function in the redirection table to be A5;

calling the third function to trigger the first function to modify the package safety information corresponding to the illegal application using a parameter set by a user.

The first function is a function overriding the third function. The third function is in the second dynamic link library.

In an example, before the first function modifies the package safety information corresponding to the illegal application using the parameter set by the user, the method may also include:

the firewall registers at an operating system to obtain a local service for waiting for and receiving the parameter set by a user.

Figure 8:
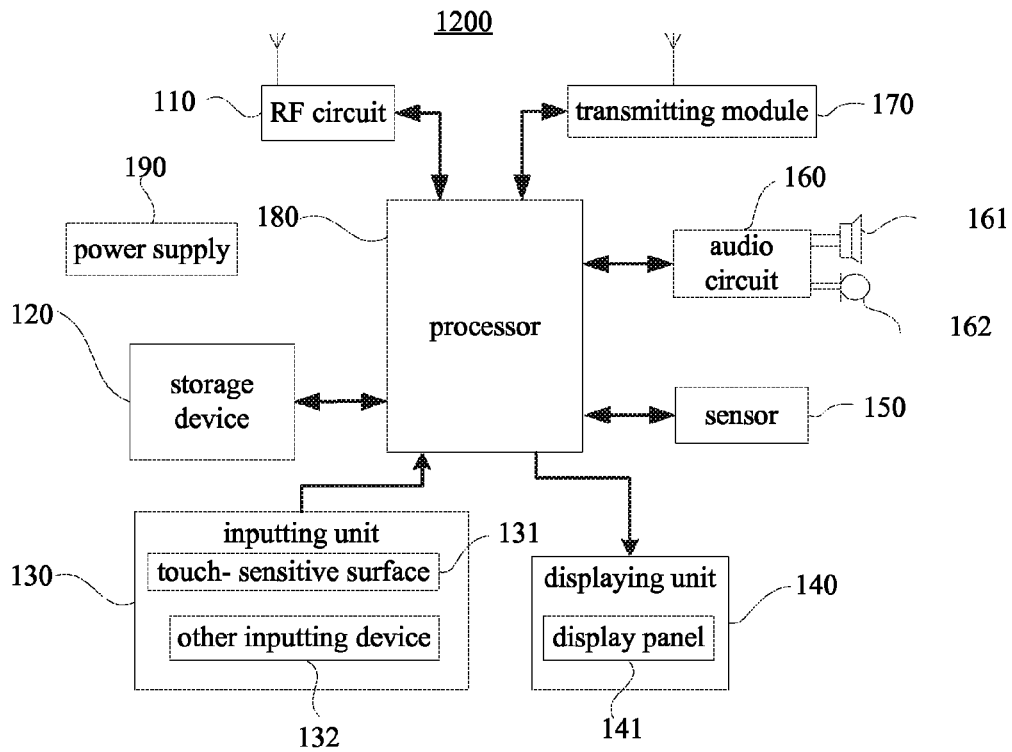

In an example as shown in FIG. 8, the terminal device 1200 may include:

a radio frequency (RF) circuit 110, at least one computer-readable storage medium 120, an inputting unit 130, a displaying unit 140, a sensor 150, an audio circuit 160, a transmitting unit 170, at least one processor 180 and a power supply 190 and the like.

The structure as shown in FIG. 7 is not for restricting the terminal device. The terminal device of various examples may include extra components or may include fewer components, or may have some of the components integrated into one component, or may have a different deployment of the components.

The RF circuit 110 is capable of sending and receiving signals during a process of information sending/receiving process or a voice communication process. In an example, the RF circuit 110 may send downlink information received from a base station to the at least one processor 180 for further processing, and may send uplink data to the base station. The RF circuit 110 may generally include, but not limited to, an antenna, at least one amplifier, a tuner, at least one oscillator, a subscriber identity module (SIM) card, a transceiver, a coupler, a low noise amplifier (LNA), a duplexer, and the like. The RF circuit 110 may perform wireless communications with a network and other devices. The wireless communications may be implemented by any communications standard or protocol including, but not limited to, Global System of Mobile (GSM) communication, General Packet Radio Service (GPRS), Code Division Multiple Access (CDMA), Wideband Code Division Multiple Access (WCDMA), Long Term Evolution (LTE), email, Short Messaging Service (SMS), and so on.

The storage device 120 stores software programs and modules, e.g., program instructions and modules corresponding to the firewall of examples of the present disclosure, and also stores data generated during the safety protection process of examples of the present disclosure. The processor 180 runs the software programs and modules stored in the storage device 120 to implement various functions and data processing to realize the safety protection mechanism of examples of the present disclosure. The storage device 120 may include an area storing programs and an area storing data. The area storing programs may store an operating system, at least one application program providing a function (e.g., audio playing function, video playing function and so on). The area storing data may store data generated during operation of the terminal device 1200 (e.g., audio data, a phone book, etc.) and so on. The storage device 120 may include a high-speed random access memory, and may also include a non-transitory memory, e.g., at least one disk storage, flash memory or other non-transitory solid state storage device and the like. Correspondingly, the storage device 120 may also include a storage controller to provide the processor 180 and the inputting unit 130 with access to the storage device 120.

The inputting unit 130 may receive digits or characters inputted, and generate a keyboard input signal, a mouse input signal, a control lever input signal, an optical input signal, or a track ball input signal which is related with user settings and function controlling. In an example, the inputting unit 130 may include a touch sensitive surface 131 and another inputting device 132. The touch sensitive surface 131, also referred to as a touch screen or a touchpad, is capable of collecting touch operations performed by a user on the surface or near the surface (e.g., an operation performed on or near the touch sensitive surface 131 using any proper object or attachment such as a finger or a touch pen and etc.), and driving a connecting apparatus corresponding to the operation according to a pre-defined procedure. In an example, the touch sensitive surface 131 may include a touch detecting apparatus and a touch controller. The touch detecting apparatus detects the position touched by the user, detects a signal generated by the touch, and sends the signal to the touch controller. The touch controller receives touch information from the touch detecting apparatus, converts the touch information into coordinates of the touch position, sends the coordinates to the processor 180, receives a command sent by the processor 180 and executes the command. The touch sensitive surface 131 may be implemented via various types of touch techniques such as resistive touch screen, capacitive touch screen, infrared touch screen and surface acoustic wave touch screen and so on. In an example, the inputting unit 131 may include another inputting device 132 besides the touch sensitive surface 131. In an example, the inputting device 132 may include, but not limited to, at least one of a physical keyboard, a function key (e.g., a volume control key, a power on/off key and etc.), a track ball, a mouse, a control lever and the like.

The displaying unit 140 is capable of displaying information inputted by the user, information provided for the user and various graphical user interfaces of the terminal device 1200. The graphical user interfaces may include any combination of graphics, texts, icons, videos. The displaying unit 140 may include a display panel 141. In an example, the display panel 141 may be implemented by Liquid Crystal Display (LCD), Organic Light-Emitting Diode (OLED) and the like. In an example, the touch sensitive surface 131 may overlay the display panel 141. When detecting a touch operation on or near the touch sensitive surface 131, the touch sensitive surface 131 sends the touch operation to the processor 180 to determine the type of the touch event. Then the processor 180 provides visual output on the display panel 141 according to the type of the touch event. Although the touch sensitive surface 131 and the display panel 141 are depicted as two independent components respectively for input and output in FIG. 11, the touch sensitive surface 131 and the display panel 141 may be integrated to provide input and output in various examples.

The terminal device 1200 may also include at least one sensor 150, e.g., an optical sensor, a motion sensor, or other types of sensors. In an example, the optical sensor may include an ambient light sensor and a proximity sensor. The ambient light sensor may adjust the brightness of the display panel 141 according to the strength of ambient light. The proximity sensor may close the display panel 141 and/or the backlight when the terminal device 1200 is held close to an ear. A gravity sensor is a type of motion sensor, may detect the amount of acceleration in multiple directions (typically XYZ-axis), the amount and the direction of gravity when kept in stationary, and can be used in applications which need to identify phone postures (such as auto screen rotation, games using the sensing result, magnetometer attitude calibration), features related with vibration identify (such as a pedometer, percussion) and the like. The terminal device 1200 may include other sensors, e.g., a gyroscope, a barometer, a hygrometer, a thermometer, infrared sensors and the like, which are not listed further herein.

The audio circuit 160, the speaker 162 and the microphone 162 may provide an audio interface between the user and the terminal device 1200. The audio circuit 160 may convert received audio data into electrical signals, and send the electrical signals to the speaker 161. The speaker 161 converts the electrical signals into sound and outputs the sound. The microphone 162 may convert collected sound signals into electrical signals which are received by the audio circuit 160. The audio circuit 160 converts the electrical signals into audio data, and sends the electrical signals to the processor 180 for processing. The processed audio data may be sent to another terminal device via the RF circuit 110, or be output to the storage device 120 for future processing. The audio circuit 160 may also include an ear jack providing communications between a peripheral earphone and the terminal device 1200. WiFi is a short-distance wireless communications technique. The terminal device 1200 may adopt a WiFi module 170 to provide wireless broadband Internet access to enable a user to send and receive emails, browse webpages and access stream media and so on. In an example, the terminal device 1200 may not include the WiFi module 170 although it is shown in FIG.

11. The structure in FIG. 11 is merely an example, modifications can be made as long as they do not change the mechanism of the examples.

The processor 180 is a control center of the terminal device 1200 which interconnects all of the components in the phone using various interfaces and circuits and monitors the phone by running or executing software programs and/or modules stored in the storage device 120 and calling various functions of the terminal device 1200 and processing data. In an example, the processor 180 may include one or more processing cores. In an example, an application processor and a modem may be integrated into the processor 180. The application processor mainly processes the operating system, user interfaces and applications and the like, and the modem mainly processes wireless communications. The modem may not be integrated into the processor 180.

The terminal device 1200 may also include a power supply 190 (e.g., a battery) providing power for various parts. In an example, the power supply may be logically connected with the processor 180 via a power supply management system to implement functions such as charging, discharging, power management and the like. The power supply 190 may also include any components such as one or multiple AC or DC power supply, a recharging system, a power failure detection circuit, a power converter or inverter, a power status indicator and the like.

Although not shown in the figures, the terminal device 1200 may also include a camera, a bluetooth module and the like, which is not described further herein. In an example, the displaying unit in the terminal device is a touch screen display. The terminal device may also include a memory and at least one program. The at least one program is stored in the memory, and includes instructions which are configured to be executed by at least one processor to implement the functions of the example.

The terminal device of the examples implements firewall functions even in absence of an iptable/netfilter module, does not have compatibility problems and is not restricted by firmware versions.

Examples of the present disclosure provide a computer-readable storage medium. The storage medium may be the storage medium in the storage device of the above examples, or may be a computer-readable storage medium which is standalone and has not been equipped into a terminal device. A computer-readable storage medium may store at least one program executable by at least one processor to implement a safety protection method which may include the following procedures.

A firewall injects a code module including a first function into a target process. The first function is capable of modifying package safety information corresponding to an illegal application.

The firewall triggers the first function to modify package safety information corresponding to the illegal application to make the illegal application fail to perform an operation due to the modified package safety information.

In an example, the target process is a host process of a package manager service (PackageManagerServic), and the package safety information is a member variable of the PackageManagerServic.

In an example, the process of the firewall injecting the code module including the first function into the target process may include:

the firewall obtains an address of a second function of a process of the firewall, which is denoted as A1, and a base address of a first dynamic link library of the process of the firewall, which is denoted as A2;

the firewall obtains a base address of a first dynamic link library of the target process, which is denoted as A3, by looking up a file in a pre-defined directory;

the firewall obtains an address of a second function of the target process, which is denoted as A4, through a calculation of $A4=A3-A2+A1$;

the firewall modifies an address of a register for the target process to be A4, and makes an address of the dynamic link library called by the second function point to an address of the code module including the first function.

The first dynamic link library is a dynamic link library called by both the process of the firewall and the target process. The second function is in the first dynamic link library. The register records an address of a currently-running function of the target process.

In an example, the procedure of triggering the first function to modify the package safety information corresponding to the illegal application may include:

searching for a base address of a second dynamic link library currently called by the target process and a redirection table of the second dynamic link library;

obtaining an address of a third function which is to be redirected from the redirection table;

obtaining an address of the first function, which is denoted as A5;

redirecting the address of the third function in the redirection table to be A5;

calling the third function to trigger the first function to modify the package safety information corresponding to the illegal application using a parameter set by a user.

The first function is a function overriding the third function. The third function is in the second dynamic link library.

In an example, before the first function modifies the package safety information corresponding to the illegal application using a parameter set by the user, the method may include:

the firewall registers at an operating system to obtain a local service for waiting for and receiving the parameter set by the user.

The computer-readable storage medium of the examples implements firewall functions even in absence of an iptable/netfilter module, does not have compatibility problems and is not restricted by firmware versions.

Those skilled in the art can understand that some or all of the steps of the methods provided by the embodiments may be implemented by hardware controlled by software. The software may be stored in a computer-readable storage medium.

The foregoing is only embodiments of the present invention. The protection scope of the present invention, however, is not limited to the above description. All the modifications, equivalent replacements or improvements, which can be easily obtained by those skilled in the art, are included within the protection scope of the present invention.

The invention claimed is:

1. A safety protection method, executable by a terminal device using a processor, the method comprising:
receiving, by a firewall, a parameter set by a user for an application;
injecting, by the firewall, a code module including a first function capable of modifying package safety information corresponding to the application into a target process, the package safety information comprises information about permissions and an identity of the application which are required for executing the application; and triggering, by the firewall, the first function to modify the identity of the application or the information about permission in the package safety information by using the parameter set by the user to make the application fail to perform an operation due to the modified package safety information.

2. The method of claim 1, wherein the target process is a host process of a package manager service (PackageManagerService) in an Android system, and the package safety information is a member variable of the PackageManagerService.

3. The method of claim 1, wherein the injecting by the firewall the code module including the first function into the target process, comprises:
obtaining, by the firewall, an address of a second function of a process of the firewall, which is denoted as A1, and a base address of a first dynamic link library of the process of the firewall, which is denoted as A2;
obtaining, by the firewall, a base address of a first dynamic link library of the target process, which is denoted as A3, by looking up a file in a pre-defined directory;
obtaining an address of a second function of the target process, which is denoted as A4, through a calculation of A4=A3−A2+A1; and
modifying an address of a register for the target process to be A4, and make an address of the dynamic link library called by the second function point to an address of the code module including the first function;
wherein the first dynamic link library is a dynamic link library called by both the process of the firewall and the target process, the second function is in the first dynamic link library, and the register records an address of a currently-running function of the target process.

4. The method of claim 1, wherein the triggering the first function to modify the package safety information corresponding to the application comprises:
searching for a base address of a second dynamic link library currently called by the target process and a redirection table of the second dynamic link library;
obtaining an address of a third function to be redirected from the redirection table;
obtaining an address of the first function, which is denoted as A5;
redirecting the address of the third function in the redirection table to be A5; and
calling the third function to trigger the first function to modify the package safety information corresponding to the application using a parameter set by a user;
wherein the first function is a function overriding the third function, and the third function is in the second dynamic link library.

5. The method of claim 4, further comprising: before the first function modifies the package safety information corresponding to the application by using the parameter set by the user,
registering, by the firewall, at an operating system to obtain a local service for waiting for and receiving the parameter set by the user.

6. A terminal device, comprising:
a storage device;
at least one program stored in the storage device, adapted to be executed by at least one processor; the at least one program includes instructions for performing the following operations:
receiving a parameter set by a user for an application;
injecting a code module including a first function into a target process, wherein the first function is capable of modifying package safety information corresponding to the application, the package safety information comprises information about permissions and an identity of the application which are required for executing the application; and
triggering the first function to modify the identity of the application or the information about permission in the package safety information by using the parameter set by the user to make the application fail to perform an operation due to the modified package safety information.

7. The terminal device of claim 6, wherein the injecting the code module including the first function into the target process comprises:
obtaining an address of a second function of a firewall process, which is denoted as A1, and a base address of a first dynamic link library of the firewall process, which is denoted as A2;
obtaining a base address of a first dynamic link library of the target process, which is denoted as A3, by looking up a file in a pre-defined directory;
obtaining an address of a second function of the target process, which is denoted as A4, through a calculation of A4=A3−A2+A1; and
modifying an address of a register for the target process to be A4, and make an address of the dynamic link library called by the second function point to an address of the code module of the first function;
wherein the first dynamic link library is a dynamic link library called by both the firewall process and the target process, the second function is in the first dynamic link library, and the register records an address of a currently-running function of the target process.

8. The terminal device of claim 6, wherein the triggering the first function to modify the package safety information corresponding to the application comprises:
searching for a base address of a second dynamic link library currently called by the target process and a redirection table of the second dynamic link library;
obtaining an address of a third function to be redirected from the redirection table;
obtaining an address of the first function, which is denoted as A5;
redirecting the address of the third function in the redirection table to be A5; and
calling the third function to trigger the first function to modify the package safety information corresponding to the application using a parameter set by a user;
wherein the first function is a function overriding the third function, and the third function is in the second dynamic link library.

9. A non-transitory computer-readable storage medium, storing at least one program executable by at least one processor to implement a safety protection method comprising:
receiving a parameter set by a user for an application;
injecting a code module including a first function capable of modifying package safety information corresponding to the application into a target process, the package safety information comprises information about permissions and an identity of the application which are required for executing the application; and
triggering the first function to modify the identity of the application or the information about permissions in the package safety information by using the parameter set by the user to make the application fail to perform an operation due to the modified package safety information.

10. The non-transitory computer-readable storage medium of claim 9, wherein the injecting the code module including the first function into the target process comprises:
   obtaining an address of a second function of a firewall process, which is denoted as A1, and a base address of a first dynamic link library of the firewall process, which is denoted as A2;
   obtaining a base address of a first dynamic link library of the target process, which is denoted as A3, by looking up a file in a pre-defined directory;
   obtaining an address of a second function of the target process, which is denoted as A4, through a calculation of $A4=A3-A2+A1$; and
   modifying an address of a register for the target process to be A4, and making an address of the dynamic link library called by the second function point to an address of the code module of the first function;
   wherein the first dynamic link library is a dynamic link library called by both the firewall process and the target process, the second function is in the first dynamic link library, and the register records an address of a currently-running function of the target process.

11. The non-transitory computer-readable storage medium of claim 9, wherein the triggering the first function to modify the package safety information corresponding to the application comprises:
   searching for a base address of a second dynamic link library currently called by the target process and a redirection table of the second dynamic link library;
   obtaining an address of a third function to be redirected from the redirection table;
   obtaining an address of the first function, which is denoted as A5;
   redirecting the address of the third function in the redirection table to be A5; and
   calling the third function to trigger the first function to modify the package safety information corresponding to the application using a parameter set by a user;
   wherein the first function is a function overriding the third function, and the third function is in the second dynamic link library.

* * * * *